(12) United States Patent
Luo et al.

(10) Patent No.: US 8,736,762 B2
(45) Date of Patent: May 27, 2014

(54) METHOD AND APPARATUS FOR COMMUNICATION BETWEEN MOBILE PHONE AND TV SET

(75) Inventors: Jun Luo, Huizhou (CN); Xianglai Li, Huizhou (CN); Shuqiang Huang, Huizhou (CN)

(73) Assignee: Huizhou TCL Mobile Communication Co., Ltd., Huizhou, Guangdong Province (CN)

( * ) Notice: Subject to any disclaimer, the term of this patent is extended or adjusted under 35 U.S.C. 154(b) by 369 days.

(21) Appl. No.: 13/381,944

(22) PCT Filed: Dec. 16, 2010

(86) PCT No.: PCT/CN2010/079900
§ 371 (c)(1),
(2), (4) Date: Dec. 31, 2011

(87) PCT Pub. No.: WO2011/131013
PCT Pub. Date: Oct. 27, 2011

(65) Prior Publication Data
US 2012/0113321 A1 May 10, 2012

(30) Foreign Application Priority Data
Apr. 20, 2010 (CN) .......................... 2010 1 0156054

(51) Int. Cl.
*H04N 7/00* (2011.01)
*H04N 11/00* (2006.01)

(52) U.S. Cl.
USPC ........... 348/552; 348/569; 348/572; 348/661; 348/705; 348/706; 348/719; 348/723; 348/729; 348/734; 348/14.02; 348/333.11; 348/333.12; 348/492; 345/82; 345/87; 345/156; 345/419; 345/649; 345/659; 455/466; 455/550.1; 455/566; 725/105; 725/113; 725/117; 725/140; 725/141

(58) Field of Classification Search
USPC ........... 348/552, 492, 569, 572, 14.02, 14.03, 348/333.11, 333.12, 661, 705, 706, 719, 348/723, 729, 734; 345/82, 87, 156, 419, 345/649, 659; 455/466, 550.1, 566; 725/105, 113, 117, 140, 141
See application file for complete search history.

(56) References Cited

U.S. PATENT DOCUMENTS

| | | | | |
|---|---|---|---|---|
| 7,203,158 | B2 * | 4/2007 | Oshima et al. | 370/208 |
| 7,327,385 | B2 * | 2/2008 | Yamaguchi | 348/207.1 |
| 7,809,407 | B2 * | 10/2010 | Oshima et al. | 455/566 |
| 8,077,846 | B2 * | 12/2011 | Gonzales | 379/102.03 |
| 2002/0066115 | A1 * | 5/2002 | Wendelrup | 725/153 |
| 2003/0160898 | A1 * | 8/2003 | Baek et al. | 348/552 |

(Continued)

*Primary Examiner* — Jefferey Harold
*Assistant Examiner* — Mustafizur Rahman
(74) *Attorney, Agent, or Firm* — Cheng-Ju Chiang

(57) ABSTRACT

The present disclosure relates to a method and an apparatus for communication between a mobile phone and a TV set. The method comprises the following steps of: generating standard RGB signals by an LCD controller in a central processing unit (CPU) of the mobile phone; transmitting the RGB signals to an LCD of the mobile phone and a TV-OUT chip simultaneously; enabling the TV-OUT chip to receive and recognize the RGB signals through configuration of commands; carrying out video conversion on the RGB signals by the TV-OUT chip to output standard AV signals; and transmitting the AV signals to a display of the TV set via a dock. With this disclosure, information on the LCD screen of the mobile phone can be transmitted to the display of the TV set.

18 Claims, 3 Drawing Sheets

(56) References Cited

U.S. PATENT DOCUMENTS

| | | | |
|---|---|---|---|
| 2004/0008287 A1* | 1/2004 | Johnston et al. | 348/734 |
| 2004/0259577 A1* | 12/2004 | Ackley | 455/466 |
| 2004/0259594 A1* | 12/2004 | Choi | 455/556.1 |
| 2005/0120381 A1* | 6/2005 | Yamaguchi | 725/105 |
| 2005/0162509 A1* | 7/2005 | Satou | 348/14.02 |
| 2006/0004834 A1* | 1/2006 | Pyhalammi et al. | 707/102 |
| 2006/0259942 A1* | 11/2006 | Toyama et al. | 725/133 |
| 2007/0109262 A1* | 5/2007 | Oshima et al. | 345/156 |
| 2009/0009511 A1* | 1/2009 | Ueda et al. | 345/419 |
| 2009/0143098 A1* | 6/2009 | Shiono | 455/556.1 |
| 2009/0172780 A1* | 7/2009 | Sukeda et al. | 726/3 |
| 2009/0262661 A1* | 10/2009 | Ueda et al. | 370/254 |
| 2010/0083338 A1* | 4/2010 | Chiang | 725/139 |
| 2010/0128859 A1* | 5/2010 | Gonzales | 379/102.03 |
| 2010/0291969 A1* | 11/2010 | Fujimoto | 455/556.1 |

* cited by examiner

METHOD AND APPARATUS FOR COMMUNICATION BETWEEN MOBILE PHONE AND TV SET

CROSS REFERENCE TO RELATED APPLICATIONS

The present application is a 35 U.S.C. §371 National Phase conversion of International (PCT) Patent Application No. PCT/CN2010/079900, filed on Dec. 16, 2010, the disclosure of which is incorporated by reference herein. The PCT International Patent Application was published in Chinese.

FIELD OF THE INVENTION

The present disclosure relates to a method and an apparatus for transmitting an image from a mobile phone to a TV (television) set, and more particularly, to a method and an apparatus for communication between a mobile phone and a TV set.

BACKGROUND OF THE INVENTION

As the use of mobile phones becomes increasingly widespread, mobile phone entertainments have become a part of modern people's life. However, a mobile phone can be used by only one or at most a few users simultaneously because of the small size of its display screen, so it cannot provide entertainment for a group of people simultaneously. Therefore, there is a need to maximize the display screen of the mobile phone.

Accordingly, improvements and advancements still have to be made in the art.

SUMMARY OF THE INVENTION

An objective of the present disclosure is to provide a method and an apparatus for communication between a mobile phone and a TV set, which are intended to solve the problem that one mobile phone cannot be used for entertainment by a plurality of users simultaneously due to its small display screen.

The technical solutions of the present disclosure are as follows:

The present disclosure provides a method for communication between a mobile phone and a TV set, comprising the following steps of:

step 11: generating standard RGB signals by an LCD controller in a central processing unit (CPU) of the mobile phone;

step 12: transmitting the RGB signals to an LCD of the mobile phone and a TV-OUT chip simultaneously;

step 13: enabling the TV-OUT chip to receive and recognize the RGB signals through configuration of commands;

step 14: carrying out video conversion on the RGB signals by the TV-OUT chip to output standard AV signals; and step 15: transmitting the AV signals to a display of the TV set via a dock.

Preferably in the method for communication between a mobile phone and a TV set, the step 14 further comprises:

step 141: carrying out color processing and format conversion on the RGB signals by the TV-OUT chip; and step 142: converting the RGB signals into the standard AV signals by a digital-to-analog converter (DAC).

Preferably in the method for communication between a mobile phone and a TV set, the commands in the step 13 are specific instructions in the corresponding chip specification.

Preferably in the method for communication between a mobile phone and a TV set, the specific instructions include a width, a height, colorway and a frequency of an input/output image whether the image is flipped by an angle, and a format of the output video.

The present disclosure provides an apparatus for communication between a mobile phone and a TV set, comprising an LCD of the mobile phone, a TV-OUT chip, an LCD controller for generating standard RGB signals, a 30-pin interface of the mobile phone, a dock and a TV set display. The LCD controller is connected to the LCD of the mobile phone and the TV-OUT chip respectively; the TV-OUT chip is configured to receive the RGB signals, convert the RGB signals into standard AV signals and transmit the standard AV signals to the 30-pin interface of the mobile phone; the standard AV signals are transmitted to the dock via the 30-pin interface of the mobile phone and then transmitted by the dock into the TV set for displaying on the TV set display.

Preferably in the apparatus for communication between a mobile phone and a TV set, the LCD controller is integrated in a CPU of the mobile phone.

Preferably in the apparatus for communication between a mobile phone and a TV set, a command communication interface is further disposed between the TV-OUT chip and the CPU of the mobile phone to transmit an instruction for video conversion from the CPU of the mobile phone to the TV-OUT chip.

Preferably in the apparatus for communication between a mobile phone and a TV set, the second pin in the 30-pin interface of the mobile phone is used for serial communication with software of the dock so as to accomplish data transmission/reception and functional operations.

Preferably in the apparatus for communication between a mobile phone and a TV set, the dock connects to the TV set via an AV cable.

According to the method and the apparatus for communication between a mobile phone and a TV set, a TV-OUT chip is installed in the mobile phone and connected to a dock via the 30-pin interface of the mobile phone so that information on the LCD screen of the mobile phone can be transmitted to the display of the TV set.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Figure 1:
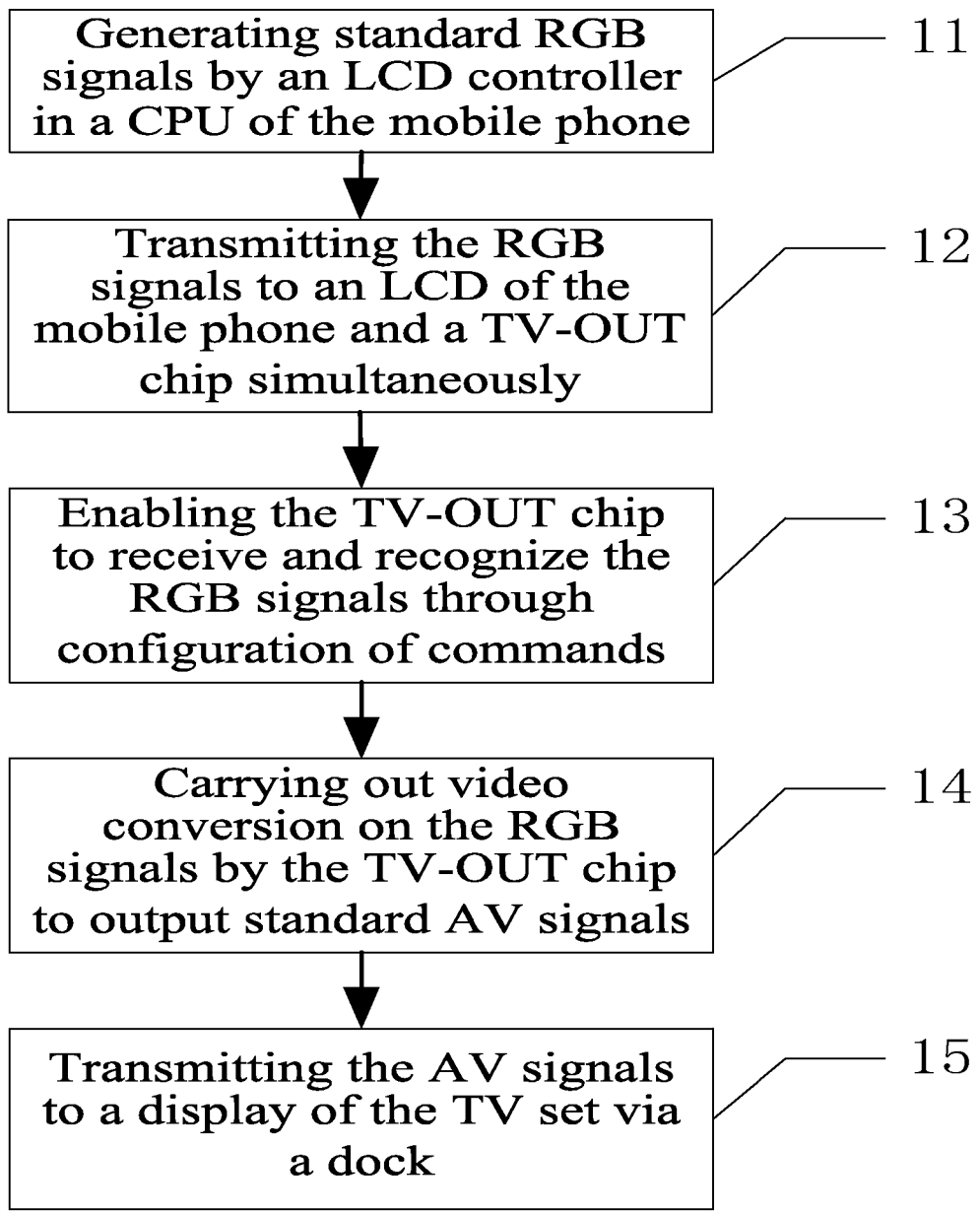
FIG. 1 is a flowchart diagram of a method according to the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Referring to FIG. 1, it is shown a flowchart diagram of a method according to an embodiment of the present disclosure. This method is used to transmit information on a display of a mobile phone (i.e., content displayed on a liquid crystal display (LCD) of the mobile phone) to a TV set display, and mainly comprises the following steps.

Step 11: generating standard RGB (i.e., the three primary colors of Red, Green and Blue) signals by an LCD controller in a central processing unit (CPU) of the mobile phone.

In high-end mobile phones, transmission of data to be displayed between the CPU and the LCD is generally accomplished via an RGB interface. According to definition of a standard RGB interface, data is output from a display memory of the processor to the LCD via a data line under driving of a frame synchronous clock, a row synchronous clock and a dot synchronous clock; thus, refreshing of an image from the dot level to the row level and then to the frame level is accomplished.

Step 12: transmitting the RGB signals to the LCD of the mobile phone and a TV-OUT chip simultaneously.

This step is the key point of the method of the present disclosure. The RGB signals are transmitted in two paths: on one hand, the RGB signals are transmitted to the LCD of the mobile phone for display; and on the other hand, the RGB signals are transmitted to the TV-OUT chip newly added in the mobile phone for processing. Only after being processed by the TV-OUT chip, can the RGB signals from the mobile phone be transmitted to the TV set for displaying.

Step 13: enabling the TV-OUT chip to receive and recognize the data from the LCD controller through configuration of commands.

The TV-OUT chip needs to specify, through the use of commands, a width, a height, colorway and a frequency of the input/output image, whether the image is flipped by an angle, the format of the output video, and other parameters. Therefore, commands must be configured in the TV-OUT chip, and the commands for specifying these parameters are sent through a command communication interface between the CPU and the TV-OUT chip. All these commands correspond to specific instructions in the corresponding chip specification, and will not be further described herein.

Step 14: carrying out video conversion on the RGB signals by the TV-OUT chip to output standard AV (Austere Version) signals.

Step 15: transmitting the AV signals to the display of the TV set via a dock.

The step 14 described above further comprises the following two steps.

Step 141: carrying out color processing and format conversion on the RGB digital video signals by the TV-OUT chip.

Possible scenarios for the conversion are as follows:

1) the TV set has a landscape screen and the mobile phone also has a landscape screen, and the image from the mobile phone is copied to the TV set after being stretched at an equal ratio in two dimensions;

2) the TV set has a landscape screen but the mobile phone has a portrait screen, and the image from the mobile phone is stretched according to the maximum longitudinal height of the TV set's screen while the non-image regions in the lateral direction are filled with a configurable background color;

3) the TV set has a landscape screen but the mobile phone has a portrait screen, and the image from the mobile phone is rotated by 90° or 270° into a landscape image and then copied to the TV set;

4) the image from the mobile phone is displayed in primary colors, and saturation of the image copied to the TV set may be adjusted depending on the user's desire; and 5) the image from the mobile phone is displayed in primary colors, and the image copied to the TV set is displayed in black and white colors.

Step 142: converting the digital signals into analog video signals (i.e., standard AV signals) by a digital-to-analog converter (DAC).

In the way described above, the content displayed on the LCD of the mobile phone can be copied to the display of the TV set so that the content from the mobile phone can be shared by a plurality of users.

Figure 2:
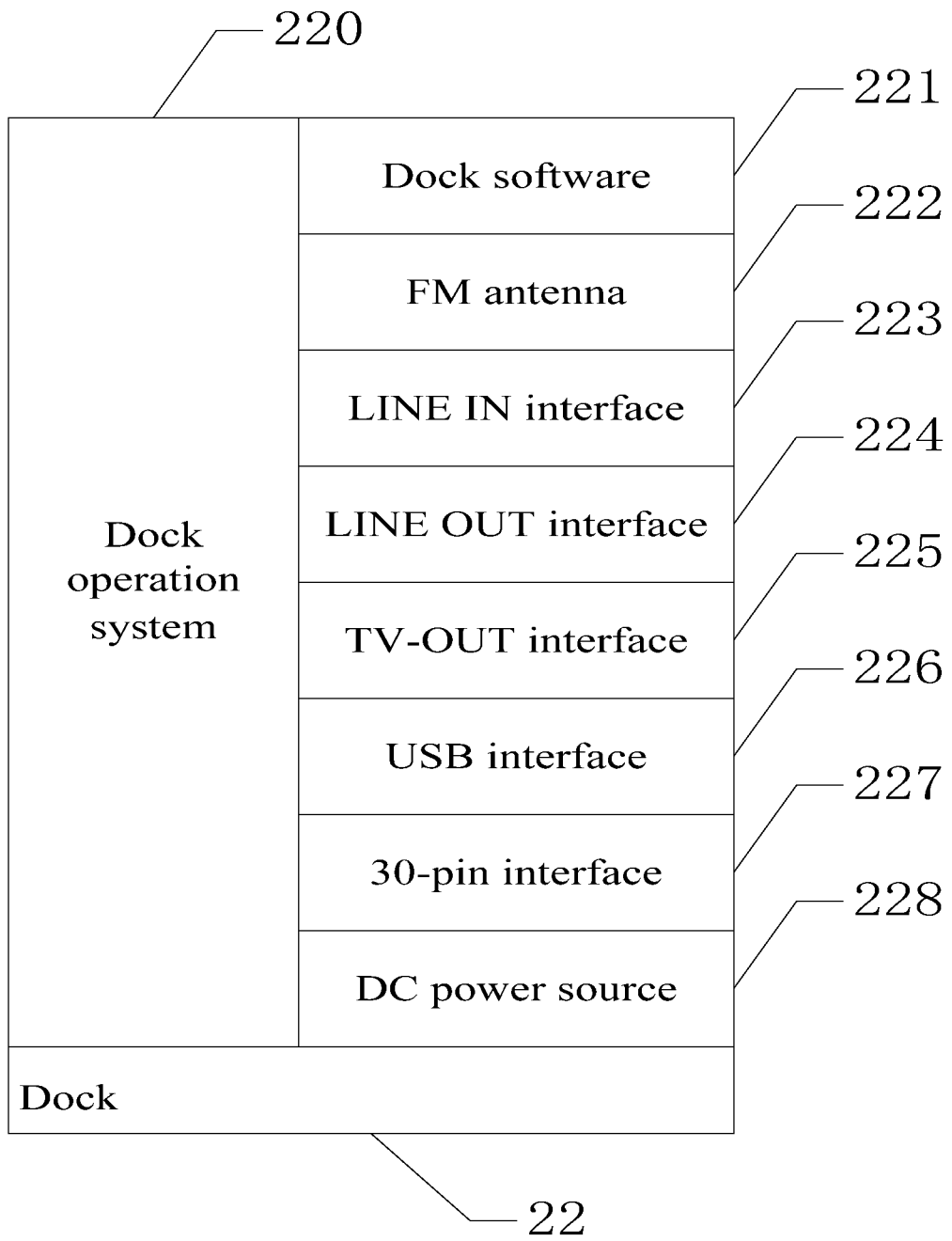
FIG. 2 shows a dock according to the present disclosure.

In order to achieve communication between the mobile phone and the TV set, an intermediary device is needed. This device is just the dock mentioned in this embodiment. As shown in FIG. 2, the dock 22 comprises a dock operation system 220, dock software 221, an FM (frequency modulation) antenna 222, a LINE IN (audio input port) interface 223, a LINE OUT (audio output port) interface 224, a TV-OUT interface 225, a USB (universal serial bus) interface 226, a 30-pin interface 227, a DC (direct current) power supply 228.

The dock operation system 220 is responsible for operating all hardware and software in the dock; the dock software 221 comprises various system software and application software (e.g., related to time display setting, alarm clock setting and etc) installed in the dock operation system; the FM antenna 222 is configured to receive an FM signal so that the dock is provided with the function of receiving a broadcast signal; the LINE IN 223 is an audio input port for receiving an audio signal (i.e., a common microphone input interface); the LINE OUT 224 is an audio output interface for outputting the audio signal to the TV set; the TV-OUT interface 225 is configured to output a video signal to the TV set, and the TV-OUT interface 225 and the LINE OUT 224 connect to the TV set via an AV cable; the 30-pin interface 227 is used to connect with a 30-pin interface of the mobile phone; and the DC power supply 228 is a DC power supply input.

Figure 3:
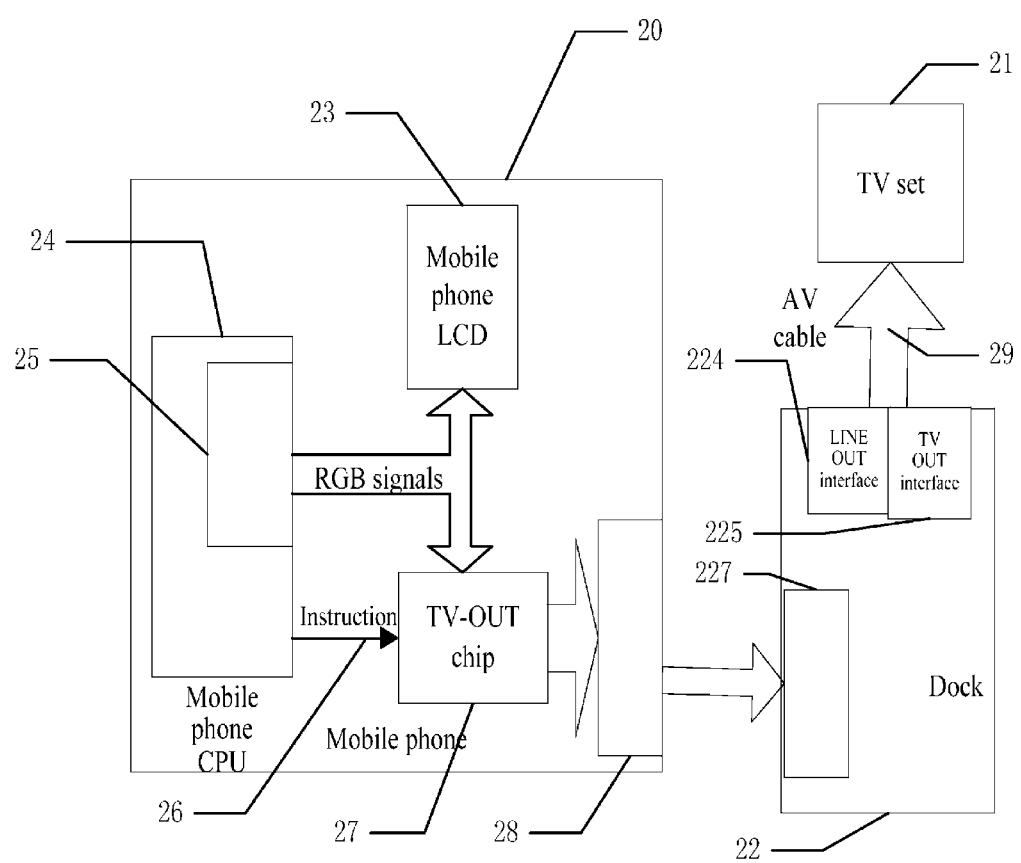
FIG. 3 is a block diagram of an apparatus according to the present disclosure.

Referring to FIG. 3, there is shown an apparatus of the present disclosure provided according to the aforesaid method. As shown, the apparatus mainly comprises a mobile phone 20, a TV set 21 and a dock 22. The apparatus is mainly characterized in that, a TV-OUT chip 27 is incorporated in the mobile phone 20, and an LCD controller 25 is integrated in the CPU 24. The LCD controller 25 transmits RGB signals it generates to the LCD 23 of the mobile phone and the TV-OUT chip 27 to which the LCD controller 25 connects. A command communication interface 26 is also disposed between the CPU 24 and the TV-OUT chip 27 to transmit an instruction for video conversion to the TV-OUT chip 27. After receiving the instruction for video conversion, the TV-OUT chip 27 converts the RGB signals into standard AV signals according to the instruction and then carries out serial communication with the software system in the dock 22 via the second pin (not shown) of the 30-pin interface 28 of the mobile phone, thus accomplishing the data transmission/reception and functional operations. The dock 22 connects to the TV 21 via an AV cable 29 so as to copy the content on the LCD 23 of the mobile phone to the display of the TV set 21 in real time.

The apparatus described above operates as follows.

Firstly, the dock 22 is connected to the DC power supply. The dock 22 is connected to the TV set via an audio cable and a video cable, and the AV mode is selected for the TV set 21.

Secondly, the mobile phone 20 in a power-on status is put into the dock 22 with the 30-pin interface 28 at the bottom being mated with the dock 22 (to be more specific, with the 30-pin interface 227 of the dock 22). The mobile phone 20 sends a power-on instruction to the dock 22 through the client-side software so that the dock 22 is powered on successfully. After the mobile phone 20 is inserted into the dock 22, the thirtieth pin of the 30-pin interface 28 of the mobile phone is pulled down to the ground so that a falling edge interruption is generated for the CPU 24 of the mobile phone to notify the inserting action. After the mobile phone 20 is removed, the pin will return to the default pull-up position, and then a rising edge interruption is generated for the CPU 24 of the mobile phone to notify the removal action.

Functions of the 30-pin interface for communication between the dock and the mobile phone are defined in the following table:

| | |
|---|---|
| 1 GND | Digital ground |
| 2 STD_RXD | Serial port reception of the dock |
| 3 STD_TXD | Serial port transmission of the dock |
| 4 USB_D+ | USB data line D+ |
| 5 VBAT_U2TXD | Battery power supply |
| 6 USB_D− | USB data line D− |
| 7 BB_download | Modem download controlling pin |
| 8 USB_BUS | USB 5 V power supply |
| 9 GND | Digital ground |
| 10 GND | Digital ground |
| 11 U0TXD | Serial port reception of the MODEM |
| 12 U0RXD | Serial port transmission of the MODEM |
| 13 - | Extended function |
| 14 - | Extended function |

-continued

| | |
|---|---|
| 15 - | Extended function |
| 16 - | Extended function |
| 17 - | Extended function |
| 18 - | Extended function |
| 19 - | Extended function |
| 20 - | Extended function |
| 21 - | Extended function |
| 22 - | Extended function |
| 23 - | Extended function |
| 24 GND | Digital ground |
| 25 TV-OUT | Video output |
| 26 - | Extended function |
| 27 AGND | Analog ground |
| 28 HP_L | Audio left sound channel |
| 29 HP_R | Audio right sound channel |
| 30 DETECT | Insertion of detection pin |

Thirdly, after the mobile phone 20 is connected to the dock 22 successfully, the client-side software is displayed by the mobile phone 20. Then, the user may operate the client-side software by clicking it or by means of a remote controller. Through communication protocols, the client-side software can execute the functions of mode switching, dock status inquiry, time setting, date setting, clock setting, music playing, and FM playing, all of which are displayed on the TV set 21.

The serial communication protocols between the mobile phone 20 and the dock 22 are as follows:

1) Table of Serial Communication Protocols:

| Direction | Frame header | Type of frame | Data length | Data section | Check | Function |
|---|---|---|---|---|---|---|
| Transmission | 0xFF 0xF9 | 0x01 | 0x01 | 0x01 | 0x01 | On/off of the dock |
| Transmission | 0xFF 0xF9 | 0x01 | 0x01 | 0x02 | 0x02 | Alarm clock delay |
| Transmission | 0xFF 0xF9 | 0x01 | 0x01 | 0x03 | 0x03 | Dock functions switching |
| Transmission | 0xFF 0xF9 | 0x01 | 0x01 | 0x04 | 0x04 | Volume up |
| Transmission | 0xFF 0xF9 | 0x01 | 0x01 | 0x05 | 0x05 | Luminance up |
| Transmission | 0xFF 0xF9 | 0x01 | 0x01 | 0x06 | 0x06 | Music: the last piece FM: the last channel |
| Transmission | 0xFF 0xF9 | 0x01 | 0x01 | 0x07 | 0x07 | Music: Pause FM: Automatic channel searching |
| Transmission | 0xFF 0xF9 | 0x01 | 0x01 | 0x08 | 0x08 | Music: the next piece FM: the next channel |
| Transmission | 0xFF 0xF9 | 0x01 | 0x01 | 0x09 | 0x09 | Reserved |
| Transmission | 0xFF 0xF9 | 0x01 | 0x01 | 0x0A | 0x0A | Volume down |
| Transmission | 0xFF 0xF9 | 0x01 | 0x01 | 0x0B | 0x0B | Dock in sleep |
| Transmission | 0xFF 0xF9 | 0x01 | 0x01 | 0x0C | 0x0C | Manual channel searching |
| Transmission | 0xFF 0xF9 | 0x01 | 0x01 | 0x0D | 0x0D | FM channel adjustment − |
| Transmission | 0xFF 0xF9 | 0x01 | 0x01 | 0x0E | 0x0E | FM channel adjustment + |
| Transmission | 0xFF 0xF9 | 0x01 | 0x01 | 0x0F | 0x0F | Setting the alarm clock No. 1 |
| Transmission | 0xFF 0xF9 | 0x01 | 0x01 | 0x10 | 0x10 | Setting the alarm clock No. 2 |
| Transmission | 0xFF 0xF9 | 0x01 | 0x01 | 0x11 | 0x11 | Setting the time |

-continued

| Direction | Frame header | Type of frame | Data length | Data section | Check | Function |
|---|---|---|---|---|---|---|
| Transmission | 0xFF 0xF9 | 0x01 | 0x01 | 0x17 | 0x17 | Inquiring the alarm clock No. 1 |
| Transmission | 0xFF 0xF9 | 0x01 | 0x01 | 0x18 | 0x18 | Inquiring the alarm clock No. 2 |
| Transmission | 0xFF 0xF9 | 0x01 | 0x01 | 0x19 | 0x19 | Inquiring the time of the dock |
| Transmission | 0xFF 0xF9 | 0x01 | 0x01 | 0x1A | 0x1A | Inquiring the dock status |
| Reception | 0xFF 0xF9 | 0x01 | 0x01 | 0x17 AA1 BB1 CC1 DD1 EE1 | CS1 | Return the alarm clock No. 1 |
| Reception | 0xFF 0xF9 | 0x01 | 0x01 | 0x18 AA2 BB2 CC2 DD2 EE2 | CS2 | Return the alarm clock No. 2 |
| Reception | 0xFF 0xF9 | 0x01 | 0x01 | 0x19 AA3 BB3 CC3 DD3 EE3 | CS3 | Return the time of the dock |
| Reception | 0xFF 0xF9 | 0x01 | 0x01 | 0x1A AA4 BB4 CC4 DD4 EE4 | CS4 | Return the status of the dock |
| Transmission | 0xFF 0xF9 | 0x01 | 0x01 | 0x23 AA1 BB1 CC1 DD1 EE1 | CS5 | Setting the alarm clock No. 1 |
| Transmission | 0xFF 0xF9 | 0x01 | 0x01 | 0x24 AA2 BB2 CC2 DD2 EE2 | CS6 | Setting the alarm clock No. 2 |
| Transmission | 0xFF 0xF9 | 0x01 | 0x01 | 0x25 AA3 BB3 CC3 DD3 EE3 | CS7 | Setting the time of the dock |

2) Protocol Supplement Table 1:

| Check bit | Calculation manner and description |
|---|---|
| CS1 | Taking one low byte of (0x17 + AA1 + BB1 + CC1 + DD1 + EE1) |
| CS2 | Taking one low byte of (0x18 + AA2 + BB2 + CC2 + DD2 + EE2) |
| CS3 | Taking one low byte of (0x19 + AA3 + BB3 + CC3 + DD3 + EE3) |
| CS4 | Taking one low byte of (0x1A + AA4 + BB4 + CC4 + DD4 + EE4) |
| CS5 | Taking one low byte of (0x23 + AA1 + BB1 + CC1 + DD1 + EE1) |
| CS6 | Taking one low byte of (0x24 + AA2 + BB2 + CC2 + DD2 + EE2) |
| CS7 | Taking one low byte of (0x25 + AA3 + BB3 + CC3 + DD3 + EE3) |

3) Protocol Supplement Table 2:

| Data section | Value | Function |
|---|---|---|
| AA1 | 0x00-0x17 | Alarm clock No. 1, hour |
| BB1 | 0x00-0x3B | Alarm clock No. 1, minute |
| CC1 | 0, 1, 2 | Alarm clock No. 1, audio mode |
| DD1 | 1-15 | Alarm clock No. 1, volume level |
| EE1 | 0, 1 | Alarm clock No. 1, on/off |
| AA2 | 0x00-0x17 | Alarm clock No. 2, hour |
| BB2 | 0x00-0x3B | Alarm clock No. 2, minute |
| CC2 | 0, 1, 2 | Alarm clock No. 2, audio mode |
| DD2 | 1-15 | Alarm clock No. 2, volume level |
| EE2 | 0, 1 | Alarm clock No. 2, on/off |
| AA3 | 0x00-0x17 | Time of the dock, hour |
| BB3 | 0x00-0x3B | Time of the dock, minute |
| CC3 | 0x00-0x77 | Time of the dock, second (accurate to 0.5 s) |
| DD3 | 0, 1 | Switching between 24-hour system and 12-hour system |
| EE3 | 0 | Reserved |
| AA4 | Bit0~bit7 | FM, iPod, AUX, bibi, FM extended bit, sleep, status of the clock, power-on or -off |
| BB4 | 0 | Backlight luminance |
| CC4 | 0-205 | FM frequency, if AA4 bit4 is 0, then (0 = 87.5 1 = 87.6); and if AA4 bit4 is 1, then 0 = 76.0 1 = 76.1 |
| DD4 | 0-15 | Volume level |
| EE4 | 0, 1 | Bass |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for communication between a mobile phone and a TV (television) set, comprising the following steps of:
   step 11: generating standard RGB signals by an LCD (liquid crystal display) controller in a central processing unit (CPU) of the mobile phone;
   step 12: transmitting the RGB signals to an LCD of the mobile phone and a TV-OUT chip simultaneously;
   step 13: enabling the TV-OUT chip to receive and recognize the RGB signals through configuration of commands;
   step 14: carrying out video conversion on the RGB signals by the TV-OUT chip to output standard AV (Austere Version) signals to the TV set.

2. The method for communication between a mobile phone and a TV set of claim 1, wherein the step 14 further comprises:
   step 141: carrying out color processing and format conversion on the RGB signals by the TV-OUT chip; and
   step 142: converting the RGB signals into the standard AV signals by a digital-to-analog converter (DAC).

3. The method for communication between a mobile phone and a TV set of claim 1, wherein the commands in the step 13 are specific instructions in the corresponding chip specification.

4. The method for communication between a mobile phone and a TV set of claim 3, wherein the specific instructions include a width, a height, colorway and a frequency of an input/output image, whether the image is flipped by an angle, and a format of the output video.

5. An apparatus for communication between a mobile phone and a TV (television) set, comprising an LCD (liquid crystal display) of the mobile phone, a TV-OUT chip, an LCD controller for generating standard RGB signals, a 30-pin interface of the mobile phone, a dock and a TV set display, wherein the LCD controller is connected to the LCD of the mobile phone and the TV-OUT chip respectively, the TV-OUT chip is configured to receive the RGB signals, convert the RGB signals into standard AV (Austere Version) signals and transmit the standard AV signals to the 30-pin interface of the mobile phone, the standard AV signals are transmitted to the dock via the 30-pin interface of the mobile phone and are then transmitted by the dock into the TV set for displaying on the TV set display.

6. The apparatus for communication between a mobile phone and a TV set of claim 5, wherein the LCD controller is integrated in a CPU (central processing unit) of the mobile phone.

7. The apparatus for communication between a mobile phone and a TV set of claim 5, wherein a command communication interface is further disposed between the TV-OUT chip and the CPU of the mobile phone to transmit an instruction for video conversion from the CPU of the mobile phone to the TV-OUT chip.

8. The apparatus for communication between a mobile phone and a TV set of claim 6, wherein the second pin in the 30-pin interface of the mobile phone is used for serial communication with software of the dock so as to accomplish data transmission/reception and functional operations.

9. The apparatus for communication between a mobile phone and a TV set of claim 7, wherein the dock connects to the TV set via an AV cable.

10. The method for communication between a mobile phone and a TV set of claim 1, wherein the step 142 comprises one of which conversions as following:
   1) the TV set having a landscape screen and the mobile phone also having a landscape screen, and the image from the mobile phone being copied to the TV set after being stretched at an equal ratio in two dimensions;
   2) the TV set having a landscape screen but the mobile phone having a portrait screen, and the image from the mobile phone being stretched according to the maximum longitudinal height of the TV set's screen while the non-image regions in the lateral direction being filled with a configurable background color;
   3) the TV set having a landscape screen but the mobile phone having a portrait screen, and the image from the mobile phone being rotated by 90° or 270° into a landscape image and then copied to the TV set;
   4) the image from the mobile phone being displayed in primary colors, and saturation of the image copied to the TV set may be adjusted depending on the user's desire; and
   5) the image from the mobile phone being displayed in primary colors, and the image copied to the TV set being displayed in black and white colors.

11. The method for communication between a mobile phone and a TV set of claim 1, wherein the AV signals to a display of the TV set is transmitting via a dock.

12. The method for communication between a mobile phone and a TV set of claim 1, wherein the dock is responsible for operating all hardware and software therein, and the dock software comprises various system software and application software installed therein.

13. A mobile phone used for implement communication between the mobile phone and a TV (television) set, the mobile phone comprising:
   a flat panel display;
   a display controller connected to the flat panel display and comprising an LCD (liquid crystal display) controller for generating standard RGB signals; and
   a TV-OUT chip receiving the RGB signals, converting the RGB signals into standard AV (Austere Version) signals and transmitting the standard AV signals out of the mobile phone for a TV set.

14. The mobile phone of claim 13, further comprising a 30-pin interface, and the standard AV signals are transmitted out via the 30-pin interface.

15. The mobile phone of claim 13, wherein the TV-OUT chip to receive and recognize the data from the LCD controller through configuration of commands.

16. The mobile phone of claim 15, wherein the commands for specifying several parameters are sent through a command communication interface between a CPU (Central Processing Unit) and the TV-OUT chip.

17. The mobile phone of claim 15, wherein the TV-OUT chip specifies one or more of which through the use of commands: a width, height, colorway and frequency of the input/output image; whether the image is flipped by an angle; the format of the output video.

18. The mobile phone of claim 13, wherein the TV-OUT chip carries out color processing and format conversion on the RGB digital video signals, and comprises one of which conversions as following:
   1) the TV set having a landscape screen and the mobile phone also having a landscape screen, and the image from the mobile phone being copied to the TV set after being stretched at an equal ratio in two dimensions;
   2) the TV set having a landscape screen but the mobile phone having a portrait screen, and the image from the mobile phone being stretched according to the maximum longitudinal height of the TV set's screen while the non-image regions in the lateral direction being filled with a configurable background color;
   3) the TV set having a landscape screen but the mobile phone having a portrait screen, and the image from the mobile phone being rotated by 90° or 270° into a landscape image and then copied to the TV set;
   4) the image from the mobile phone being displayed in primary colors, and saturation of the image copied to the TV set may be adjusted depending on the user's desire; and
   5) the image from the mobile phone being displayed in primary colors, and the image copied to the TV set being displayed in black and white colors.

* * * * *